United States Patent
Cadarette et al.

(10) Patent No.: US 11,030,216 B2
(45) Date of Patent: Jun. 8, 2021

(54) REPLICATING NON-SUPPORTED DATA TYPES USING AN EXISTING SUPPORTED REPLICATION FORMAT

(71) Applicant: International Business Machines Corporation, Armonk, NY (US)

(72) Inventors: Paul M. Cadarette, Hemet, CA (US); Martin W. J. Cocks, Hursley (GB); Scott K. S. Singleton, San Jose, CA (US); John S. Tilling, Chandlers Ford (GB); Austin J. Willoughby, Voorheesville, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 15/864,766

(22) Filed: Jan. 8, 2018

(65) Prior Publication Data
US 2019/0213274 A1    Jul. 11, 2019

(51) Int. Cl.
*G06F 16/00* (2019.01)
*G06F 16/27* (2019.01)
(Continued)

(52) U.S. Cl.
CPC .............. *G06F 16/27* (2019.01); *G06F 3/065* (2013.01); *G06F 3/067* (2013.01); *G06F 3/0619* (2013.01);
(Continued)

(58) Field of Classification Search
CPC .......... G06F 16/258; G06F 16/27; G06F 8/71; G06F 16/185; G06F 16/214;
(Continued)

(56) References Cited

U.S. PATENT DOCUMENTS 6,016,501 A * 1/2000 Martin .................. G06F 16/275
6,029,178 A * 2/2000 Martin .................... G06F 16/27
(Continued)

FOREIGN PATENT DOCUMENTS

EP    2494459 A2    9/2012
JP    5995981       9/2016
(Continued)

OTHER PUBLICATIONS

List of IBM Patents or Patent Applicatians Treated as Related, Nov. 20, 2018, 2 pages.
(Continued)

*Primary Examiner* — Shyue Jiunn Hwa
(74) *Attorney, Agent, or Firm* — Francis Lammes; Stephen J. Walder; Steven Bouknight

(57) ABSTRACT

A mechanism is provided for replicating non-supported data types using an existing replication format supported by an existing replication system. Responsive to detecting an application writing data to a local storage that is to be replicated to the secondary site, the input/output (I/O) operation being performed by the application is intercepted. Data of the I/O operation in a non-supported format is converted to a format supported by the existing replication system. A replication log record is generated for the data in the format supported by the existing replication system. The data described by the replication log record for the data is then stored in a storage device at the secondary site.

15 Claims, 3 Drawing Sheets

(51) Int. Cl.
  *G06F 3/06* (2006.01)
  *G06F 16/23* (2019.01)
  *G06F 16/25* (2019.01)
  *G06F 16/28* (2019.01)
(52) U.S. Cl.
  CPC ........ *G06F 16/2358* (2019.01); *G06F 16/258* (2019.01); *G06F 16/23* (2019.01); *G06F 16/284* (2019.01)
(58) Field of Classification Search
  CPC . G06F 16/254; G06F 8/10; G06F 8/60; G06F 8/61; G06F 9/44536; G06F 9/45533; G06F 16/11; G06F 16/21; G06F 16/23; G06F 16/256; G06F 16/283; G06F 16/284; G06F 16/84; G06F 16/86; G06F 16/88; G06F 16/904; G06F 16/972; G06F 8/34; G06F 8/35; G06F 8/51; G06F 8/65; G06F 8/654; G06F 8/658; G06F 8/70; G06F 9/30003; G06F 9/30018; G06F 9/30021; G06F 9/30025; G06F 9/3004; G06F 9/44521; G06F 9/5011; G06F 9/541; G06F 16/22; G06F 16/2282; G06F 16/235; G06F 16/24; G06F 16/2455; G06F 16/248; G06F 16/275; G06F 16/90335; G06F 7/00; G06F 8/453; G06F 11/2097; G06F 16/273; G06F 11/1451; G06F 11/2094; G06F 16/2246; G06F 40/151; G06F 11/0787; G06F 3/0482; G06F 3/0607; G06F 3/0644; G06F 16/282; G06F 2201/80; G06F 2201/82; G06F 3/065; G06F 11/1438; G06F 11/1441; G06F 16/00; G06F 21/575; G06F 9/4418; G06F 3/0674; G06Q 10/06; G06Q 10/087; G06Q 10/10; G06Q 10/20; G06Q 20/10; G06Q 30/0222; G06Q 30/0283; G06Q 30/04; G06Q 30/0601; G06Q 40/00; G06Q 40/04; G06Q 40/12; G06Q 40/123; G06Q 40/125
  See application file for complete search history.

(56) References Cited

U.S. PATENT DOCUMENTS

| | | | | |
|---|---|---|---|---|
| 6,035,307 A | * | 3/2000 | Martin | G06F 16/258 |
| 6,092,086 A | * | 7/2000 | Martin | G06F 16/27 |
| 7,814,459 B2 | * | 10/2010 | Behnen | G06Q 10/10 |
| | | | | 717/104 |
| 7,962,458 B2 | | 6/2011 | Holenstein et al. | |
| 8,037,056 B2 | | 10/2011 | Naicken et al. | |
| 8,214,353 B2 | | 7/2012 | Inturi et al. | |
| 8,301,593 B2 | | 10/2012 | Hoffmann et al. | |
| 8,983,899 B1 | | 3/2015 | Ghait et al. | |
| 9,305,070 B2 | | 4/2016 | Zhu et al. | |
| 9,367,252 B2 | | 6/2016 | Rath et al. | |
| 9,411,873 B2 | | 8/2016 | Rath et al. | |
| 9,442,995 B2 | | 9/2016 | Pareek et al. | |
| 2005/0256892 A1 | * | 11/2005 | Harken | G06Q 10/10 |
| 2010/0191884 A1 | | 7/2010 | Holenstein et al. | |
| 2012/0023116 A1 | * | 1/2012 | Wilkes | G06F 16/2452 |
| | | | | 707/756 |
| 2014/0007267 A1 | | 1/2014 | Cole et al. | |
| 2014/0208012 A1 | | 7/2014 | Kotagiri et al. | |
| 2016/0085837 A1 | | 3/2016 | Kotagiri et al. | |
| 2016/0210344 A1 | | 7/2016 | Bourbonnais et al. | |
| 2016/0285678 A1 | | 9/2016 | Rath et al. | |
| 2017/0017403 A1 | | 1/2017 | Sekine et al. | |
| 2017/0060695 A1 | * | 3/2017 | Clare | G06F 3/065 |
| 2018/0143879 A1 | * | 5/2018 | Dornemann | G06F 11/203 |
| 2018/0173780 A1 | * | 6/2018 | Rosier | G06F 16/282 |

FOREIGN PATENT DOCUMENTS

| | | |
|---|---|---|
| WO | WO 2011/053834 A2 | 5/2011 |
| WO | WO 2012/051199 A2 | 4/2012 |

OTHER PUBLICATIONS

"FCLGC—File Control Log Record Format", IBM Corporation, https://www.ibm.com/support/knowledgecenter/SSGMCP_5.2.0/com.ibm.cics.ts.doc/dfhs4/DFHFCLGK.html, Version 5.2.0, retrieved from the internet Feb. 1, 2017, 7 pages.

"Using an apply exit", IBM Corporation, http://www.ibm.com/support/knowledgecenter/SSDP9F_11.3.0/com.ibm.swg.im.iis.clz.imsr.overview.doc/topics/iiyitoiuseapplyexit.html, retrieved from the Internet Feb. 1, 2017, 1 page.

Abu-Libdeh, Hussam et al., "RACS: A Case for Cloud Storage Diversity", ACM, Proceedings of the 1st ACM symposium on Cloud computing, SoCC'10, Indianapolis, Indiana, Jun. 10-11, 2010, pp. 229-240.

Borden, Terry et al., "InfoSphere Data Replication for VSAM for z/OS 11.3 performance improvements", IBM Corporation, developerWorks, Apr. 9, 2015, 12 pages.

* cited by examiner

… (1) …

REPLICATING NON-SUPPORTED DATA TYPES USING AN EXISTING SUPPORTED REPLICATION FORMAT

BACKGROUND

The present application relates generally to an improved data processing apparatus and method and more specifically to mechanisms for replicating non-supported data types using an existing replication format supported by an existing replication engine.

Data replication is the process of copying data from one location to another. Data replication technology helps an enterprise possess up-to-date copies of its data in the event of a disaster. Data replication may take place over a storage area network, local area network, local wide area network, or the cloud. For disaster recovery (DR) purposes, data replication typically occurs between a primary storage location and a secondary offsite location. There are many approaches to data replication such that there are four places where replication may occur: in the host, hypervisor, storage array, or network.

Host-based replication uses servers to copy data from one site to another, using software on application servers. It is usually log-based and asynchronous. Host-based replication software includes capacities such as deduplication, compression, encryption and throttling.

Hypervisor-based replication is a type of host-based replication that replicates entire virtual machines from one host server or host cluster to another. Because it is specifically designed for virtual machines (VMs), hypervisor replication makes it easy to fail over to the replicated copy if the primary copy of the VM is lost. Further, hypervisor replication may run on servers that do not natively support replication. All host-based replication uses CPU resources, which may impact server performance.

Array-based replication allows compatible storage arrays to use built-in software to automatically copy data between arrays. Array-based replication is more resilient and requires little cross-departmental coordination when deployed. But array-based replication is limited to homogeneous storage environments, as array-based replication requires similar source and target arrays.

Network-based replication requires an extra switch or appliance between storage arrays and servers. Network-based replication typically takes place in heterogeneous storage environments—network-based replication works with any array and supports any host platform. There are fewer network-based replication products on the market compared to array- and host-based offerings.

Data replication may be synchronous or asynchronous, depending on when it takes place. Synchronous data replication takes place in real time, and is preferred for applications with low recovery time objectives that can't lose data. It's primarily used with high-end transactional applications that require instantaneous failover in the event of a failure. This replication approach is more expensive and creates latency that slows the primary application. Synchronous data replication also tends to be limited by distance and often impossible for long distance replication to a secondary site that is geographically far enough away to not be impacted by geographic disasters. Synchronous data replication is supported by array-based and most network-based replication products, but rarely in host-based ones.

Asynchronous data replication is time-delayed. Asynchronous data replication is designed to work over distances and requires less bandwidth. This replication is intended for businesses that can withstand lengthier recovery point objectives. Because there is a delay in the copy time, the two data copies are often not identical. Asynchronous data replication is supported by array-, network- and host-based replication products.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for replicating non-supported data types using an existing replication format supported by an existing replication system. The illustrative embodiment intercepts the input/output (I/O) operation being performed by the application in response to detecting an application writing data to a local storage that is to be replicated to the secondary site. The illustrative embodiment converts data of the I/O operation in a non-supported format to a format supported by the existing replication system. The illustrative embodiment generates a replication log record for the data in the format supported by the existing replication system. The illustrative embodiment stores the data described by the replication log record for the data in a storage device at the secondary site.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
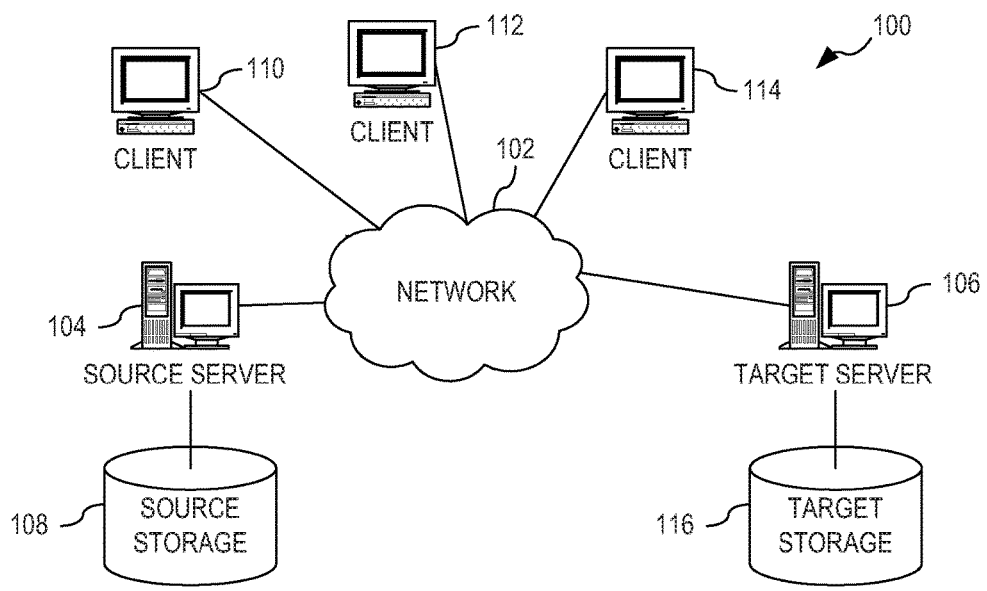
FIG. 1 is an example diagram of a distributed data processing system in which aspects of the illustrative embodiments may be implemented.

The illustrative embodiments provide mechanisms for replicating non-supported data types using an existing replication format supported by an existing replication engine. As noted above, in order to provide high availability for various computer systems to access data, that data is replicated to a secondary site to avoid serious outages caused by natural disasters, unforeseen events, or other problems that might impact access to the data. Software replication helps minimize both Recovery Time Objective (RTO) and Recovery Point Objective (RPO). Recovery Time Objective (RTO) is the time required to bring business applications back online and Recovery Point Objective (RPO) is the amount of data lost during the outage. The requirement for this type of support may be enterprise specific. Solutions are available for data replication currently includes Relational Database Management Systems (RDBMS), Information Management Systems (IMS), Virtual Storage Access Methods (VSAM) system, among others.

Therefore, the illustrative embodiments provide mechanisms for replicating non-supported data types using an existing replication format supported by an existing replication engine. As an application at a primary site writes data of a non-supported replication data type, i.e. a data type not supported by the replication mechanism, to a local storage that is to be replicated to a secondary site, the replication mechanism at the primary site intercepts the input/output (I/O) operation being performed by the application and, using externally documented record format descriptions created for the application, the replication mechanism generates a replication log record in the format supported by the replication mechanism. More specifically, the replication mechanism analyzes the documented record format descriptions for the application that is writing the non-supported data type. The documented record format descriptions specify how data is written, how the data is formatted, and the like. Using the information from the documented record format descriptions, the replication mechanism converts the intercepted I/O into a format that is supported by the replication mechanism. Utilizing the discrete replication log record, once the data has been transmitted to the secondary site, a replication mechanism at the secondary site, which is a same replication mechanism as the replication mechanism at the secondary site, using the same externally documented record format descriptions created for the application, to generate data from the replication log record in the original format that the application uses to write the data to the local storage. Thus, the replication mechanism generates a replication log record that includes a name of the application for which the data is associated and the association to the replicated file. As the data is updated, rewritten, read-for-updates, deleted, or the like, the replication mechanism records each of the updates, writes, reads, deletes, or the like, in the replication log through discrete replication log records.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
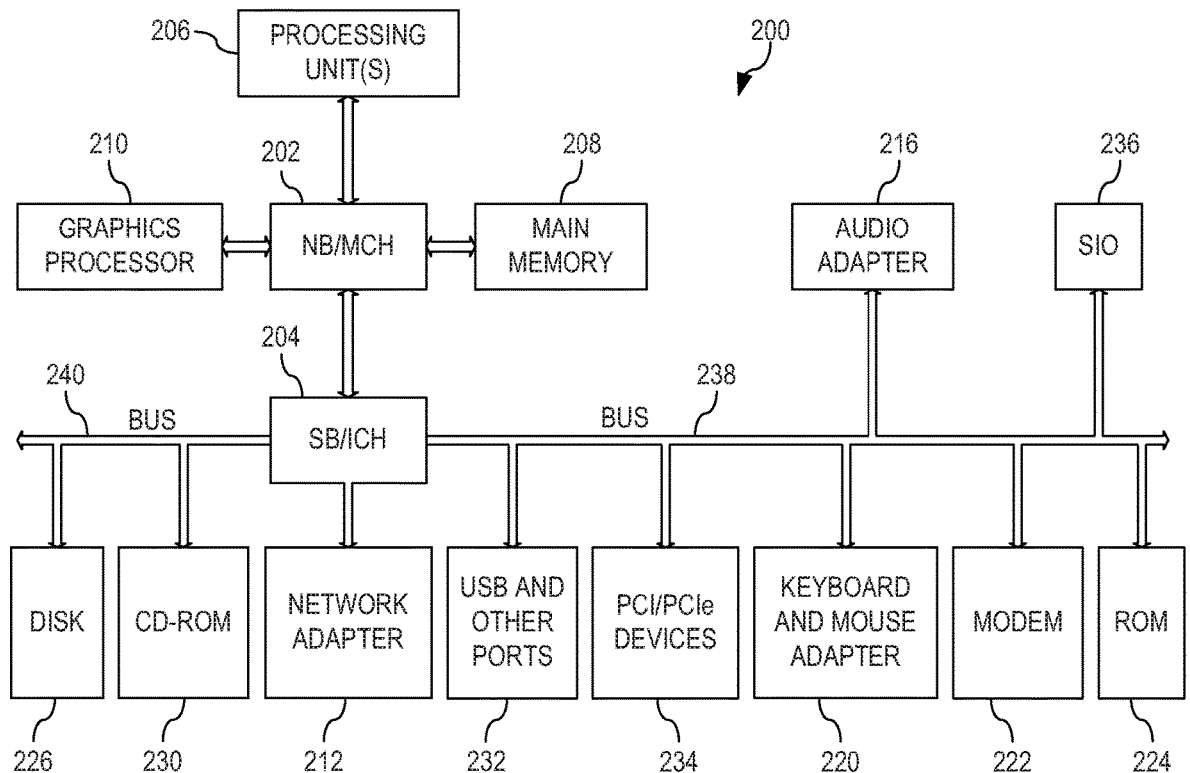
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, source server 104 and target server 106 are connected to network 102. Coupled to source server 104 is source storage 108. Coupled to target server 106 is target storage 116. In addition, clients 110, 112, and 114 are also connected to network 102. These clients 110, 112, and 114 may be, for example, personal computers, network computers, or the like. In the depicted example, source server 104 provides data, such as boot files, operating system images, and applications to the clients 110, 112, and 114. Clients 110, 112, and 114 are clients to source server 104 in the depicted example. Target server 106 is a replication server where data is replicated from sources storage 108 to target storage 116 via source server 104. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a replication mechanism that replicates non-supported data types using an existing replication format supported by an existing replication system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates replicating non-supported data types using an existing replication format supported by an existing replication system.

As noted above, the mechanisms of the illustrative embodiments utilize specifically configured computing devices, or data processing systems, to perform the operations for replicating non-supported data types using an existing replication format supported by an existing replication system. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the replicating non-supported data types using an existing replication format supported by an existing replication system.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
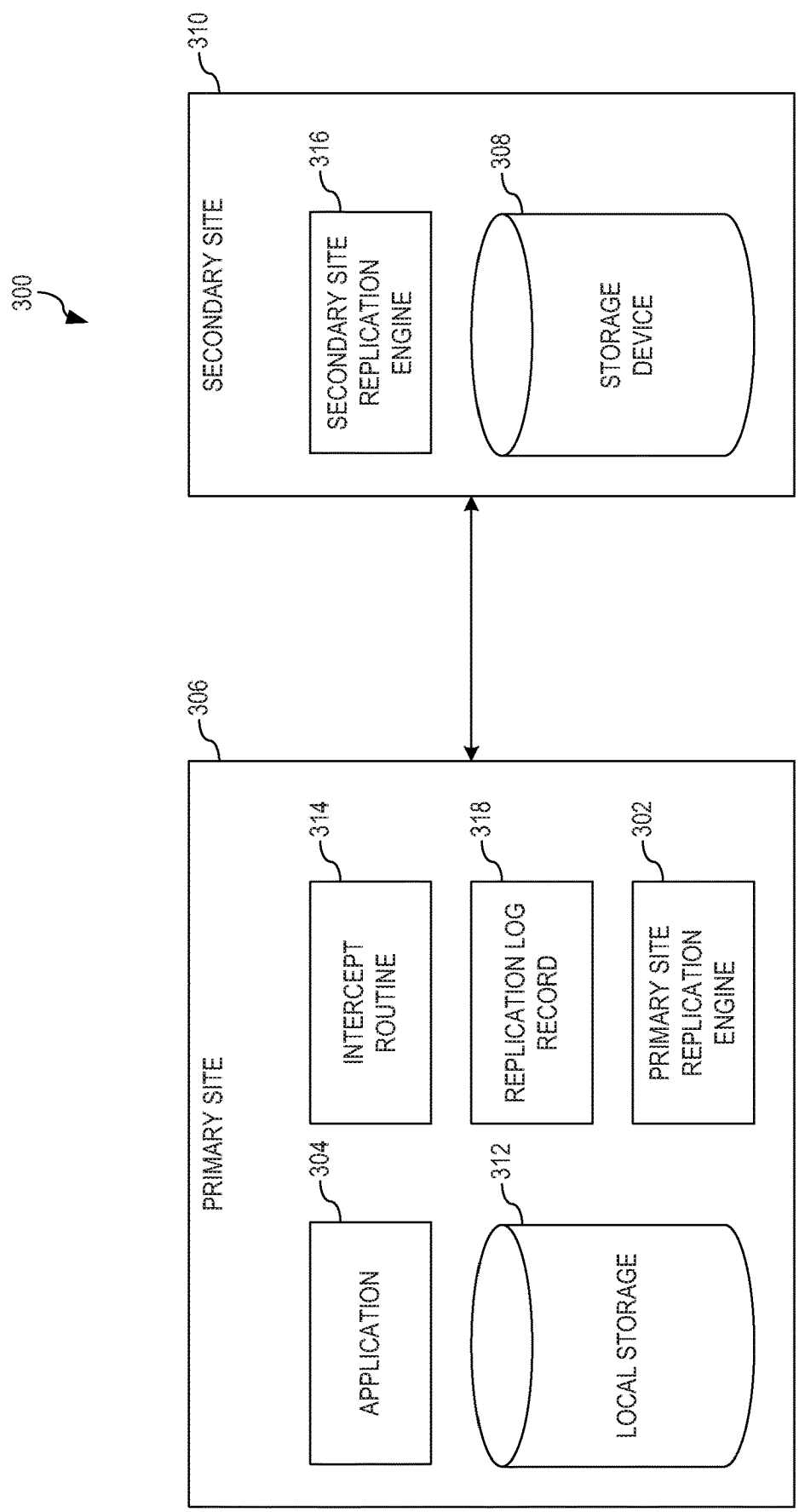
FIG. 3 depicts a functional block diagram of a replication mechanism that replicates non-supported data types using an existing replication format supported by an existing replication engine in accordance with an illustrative embodiment.

FIG. 3 depicts a functional block diagram of a replication mechanism that replicates non-supported data types using an existing replication format supported by an existing replication system in accordance with an illustrative embodiment. Data processing system 300 comprises primary site replication engine 302 that is coupled to application 304 at primary site 306 and coupled to secondary site replication engine 316 at secondary site 310. Application 304 may utilize, for example, a queued sequential access method (QSAM), a basic direct access method (BDAM), or the like, to read and write datasets sequentially. Both primary site replication engine 302 and secondary site replication engine 316 may utilize Relational Database Management Systems (RDBMS), Information Management Systems (IMS), Virtual Storage Access Methods (VSAM) system, or the like.

As application 304 writes data to local storage 312, intercept routine 314 intercepts the write operation in order to log the write data in replication log record 318 in a known format supported by primary site replication engine 302 and secondary site replication engine 316. That is, using externally documented record format descriptions created for application 304, intercept routine 314 generates replication log record 318 for the data in the format supported by primary site replication engine 302 and secondary site replication engine 316. That is, intercept routine 314 analyzes the documented record format descriptions created for application 304. The documented record format descriptions specify how data is written, how the data is formatted, and the like. Using the information from the documented record format descriptions, intercept routine 314 formats the data into replication log record 318 as it is being output from application 304 in a format supported by primary site replication engine 302 and secondary site replication engine 316. Replication log record 318 includes a name of application 304 for which the data is associated and the association to the data to that that will be stored in storage device 308. Once application 304 has written the data to local storage 312 and intercept routine 314 has logged the write data in replication log record 318, primary site replication mechanism 302 reads replication log record 318 and transmits the data in the supported format to secondary site replication mechanism 316.

At secondary site 310, secondary site replication engine 316 receives the data in the supported format. Utilizing the data in the supported format, secondary site replication engine 316 may perform a plurality of different operations. The first is to convert the data from the supported format back to the original format application 304 wrote the data in. Since a same application may exist at or access data at secondary site 310, having the data in the original format would be beneficial. Thus, secondary site replication engine 316 may apply the changes made by intercept routine 314 in reverse to generate the data in the original format, which is then stored in storage device 308.

In an alternative embodiment, secondary site replication engine 316 may store the data in the format supported by secondary site replication engine 316. That is, the data stored at secondary site 301 may be simply for having a backup of the data. If data becomes corrupt at primary site 306 for some reason, rather than having to convert the data back to a transmission format, utilizing data that is already converted to the transmission format may expedite recovery. Thus, secondary site replication engine 316 may store the data in storage device 308 in the format supported by secondary site replication engine 316. As the replicated data is updated, rewritten, read-for-updates, or deleted, intercept routine 314 records each update, write, read, or delete in the replication log record associated with the replicated data.

In order to exemplify the process being performed by data processing system 300, consider, for example, that application 304 writes most of its data in a VSAM format but also writes some of its data in a QSAM format. While application 304 may store the data in both formats in local storage 312 the data is also to be replicated to storage device 308. However, primary site replication engine 302 and secondary site replication engine 316 do not support QSAM formatted data. Thus, in order to replicate all of the data written by application 304, intercept routine 314 intercepts the data write performed by application 304 and, using information from the documented record format descriptions utilized by application 304, formats the portion of data in the QSAM format into a VSAM format. Once application 304 has written the data in VSAM and QSAM format to local storage 312 and intercept routine 314 has logged the write data in the VSAM format only to replication log record 318, primary site replication mechanism 302 reads replication log record 318 and transmits the data in the VSAM format to secondary site replication mechanism 316.

At secondary site 310, secondary site replication engine 316 receives the data in the VSAM format. Utilizing the data in the VSAM format, secondary site replication engine 316 may for example, convert the portion of data that was converted to the VSAM format back to a QSAM format and store the data in VSAM and QSAM format to storage device 308 or simply store the data in the VSAM format to storage device 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
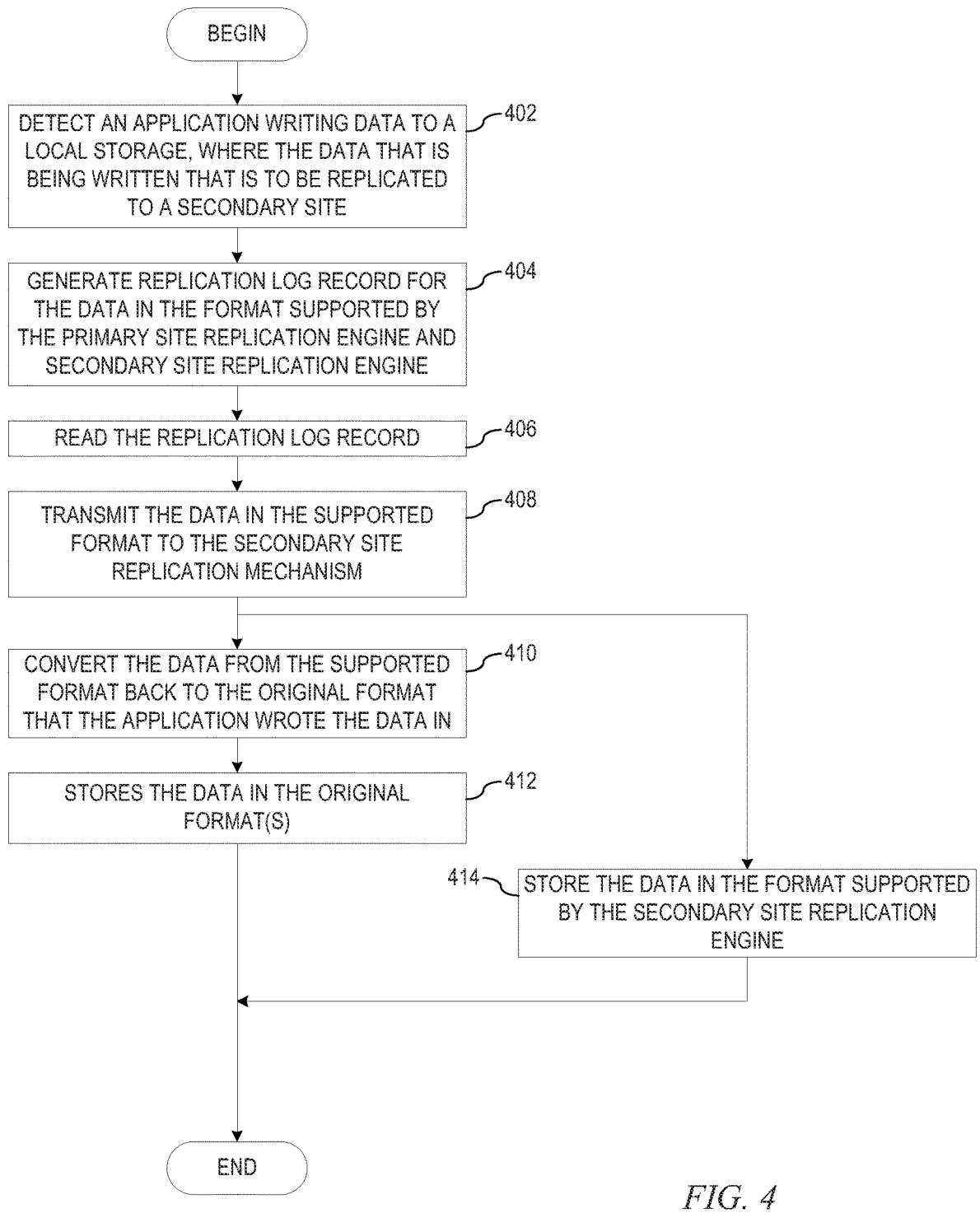
FIG. 4 depicts a flow diagram of an exemplary operation performed by a replication mechanism in replicating non-supported data types using an existing replication format supported by an existing replication engine in accordance with an illustrative embodiment.

FIG. 4 depicts a flow diagram of an exemplary operation performed by a replication mechanism in replicating non-supported data types using an existing replication format supported by an existing replication system in accordance with an illustrative embodiment. As the operation begins, intercept routine detects an application writing data to a local storage, where the data that is being written is to be replicated to a secondary site (step 402). Using externally documented record format descriptions created for the application, the intercept routine generates replication log record for the data in the format supported by the primary site replication engine and secondary site replication engine (step 404). That is, the intercept routine analyzes the documented record format descriptions created for the application. The documented record format descriptions specify how data is written, how the data is formatted, and the like. Using the information from the documented record format descriptions, the intercept routine formats the data into a replication log record as it is being output from the application in a format supported by the primary site replication engine and the secondary site replication engine. The replication log record includes a name of application for which the data is associated and the association to the data to that that will be stored in the storage device.

Once the application has written the data to the local storage and the intercept routine has logged the write data in the replication log record, the primary site replication mechanism reads the replication log record (step 406) and transmits the data in the supported format to the secondary site replication mechanism (step 408). At the secondary site, utilizing the data in the supported format, secondary site replication engine converts the data from the supported format back to the original format that the application wrote the data in (step 410) and stores the data in the original format(s) (step 412), with the operation ending thereafter. Alternatively, from step 408, at the secondary site, utilizing the data in the supported format, secondary site replication engine stores the data in the format supported by the secondary site replication engine (step 414), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for replicating non-supported data types using an existing replication format supported at the secondary site. As an application writes data to a local storage that is to be replicated to a secondary site, an intercept routine generates a replication log record in the format supported by the primary site replication engine and the secondary site replication engine. The primary site replication mechanism reads the replication log record and transmits the data to the secondary site replication mechanism. The secondary site replication mechanism either stores the data in the supported format or converts the data that was converted to the supported format back to the original format and then stores the data.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for replicating non-supported data types using an existing replication format supported by an existing replication system operating at a primary site and a secondary site, the method comprising:
   responsive to detecting an application, at the primary site, writing data in a non-supported format to a local storage that is to be replicated to the secondary site, intercepting, by an intercept routine operating at a primary site, the input/output (I/O) operation being performed by the application operating at the primary site;
   converting, by the intercept routine, the data of the I/O operation m the non-supported format to a format supported by the existing replication system;
   generating, by the intercept routine, a replication log record for the data in the format supported by the existing replication system; and
   transmitting, by a primary site replication engine operating at the primary site, the data in the format supported by the existing replication system to the secondary site, wherein by transmitting the data in the format supported by the existing replication system to the secondary site, a secondary site replication engine operating at the secondary site:
      stores the data in the format supported by the existing replication system described by the replication log record in a storage device at the secondary site thereby forming a replicated file;
      converts the data in the format supported by the existing replication system to the non-supported format; and
      stores the data in the non-supported format in the storage device at the secondary site for use by an application operating at the secondary site.

2. The method of claim 1, wherein generating the replication log record for the data in the format supported by the existing replication system comprises:
   identifying, by the intercept routine, documented record format descriptions created for the application, wherein the documented record format descriptions specify how the data in the format supported by the existing replication system is formatted when written; and
   using the documented record format descriptions, formatting, by the intercept routine, the data in the non-supported format as the data in the non-supported format is being output from the application in the format supported by the existing replication system.

3. The method of claim 1, wherein the replication log record for the data in the format supported by the existing replication system comprises a name of the application for which the data in the format supported by the existing replication system is associated and an association to the replicated file stored in the storage device and wherein the replication log record is used to store the data in the format supported by the existing replication system at the secondary site.

4. The method of claim 1, further comprising:
   as the replicated file is updated, rewritten, read-for-updates, or deleted, recording, by the intercept routine, in the replication log record associated with the data in the format supported by the existing replication system each update, write, read, or delete.

5. The method of claim 1, wherein the existing replication system is one of a Relational Database Management System (RDBMS), an Information Management System (IMS), or a Virtual Storage Access Method (VSAM) system.

6. A computer program product comprising a computer readable storage medium having a computer readable program stored therein for replicating non-supported data types using an existing replication format supported by an existing replication system operating at a primary site and a secondary site, wherein the computer readable program, when executed on a computing device, causes the computing device to:
   responsive to detecting an application, at the primary site, writing data in a non-supported format to a local storage that is to be replicated to the secondary site, intercept, by an intercept routine operating at a primary site, the input/output (I/O) operation being performed by the application operating at the primary site;
   convert, by the intercept routine, the data of the I/O operation m the non-supported format to a format supported by the existing replication system;
   generate, by the intercept routine, a replication log record for the data in the format supported by the existing replication system; and
   transmit, by a primary site replication engine operating at the primary site, the data in the format supported by the existing replication system to the secondary site, wherein by transmitting the data in the format supported by the existing replication system to the secondary site, a secondary site replication engine operating at the secondary site:
      stores the data in the format supported by the existing replication system described by the replication log record in a storage device at the secondary site thereby forming a replicated file;
      converts the data in the format supported by the existing replication system to the non-supported format; and
      stores the data in the non-supported format in the storage device at the secondary site for use by an application operating at the secondary site.

7. The computer program product of claim 6, wherein the computer readable program to generate the replication log record for the data in the format supported by the existing replication system causes the computing device to:
   identify, by the intercept routine, documented record format descriptions created for the application, wherein the documented record format descriptions specify how the data in the format supported by the existing replication system is formatted when written; and
   using the documented record format descriptions, format, by the intercept routine, the data in the non-supported format as the data in the non-supported format is being output from the application in the format supported by the existing replication system.

8. The computer program product of claim 6, wherein the replication log record for the data in the format supported by the existing replication system comprises a name of the application for which the data in the format supported by the existing replication system is associated and an association to the replicated file stored in the storage device and wherein the replication log record is used to store the data in the format supported by the existing replication system at the secondary site.

9. The computer program product of claim 6, wherein the computer readable program further causes the computing device to:
as the replicated file is updated, rewritten, read-for-updates, or deleted, record, by the intercept routine, in the replication log record associated with the data in the format supported by the existing replication system each update, write, read, or delete.

10. The computer program product of claim 6, wherein the existing replication system is one of a Relational Database Management System (RDBMS), an Information Management System (IMS), or a Virtual Storage Access Method (VSAM) system.

11. An apparatus for replicating non-supported data types using an existing replication format supported by an existing replication system operating at a primary site and a secondary site comprising:
a processor; and
a memory coupled to the processor, wherein the memory comprises instructions which, when executed by the processor, cause the processor to:
responsive to detecting an application, at the primary site, writing data in a non-supported format to a local storage that is to be replicated to the secondary site, intercept, by an intercept routine operating at a primary site, the input/output (I/O) operation being performed by the application operating at the primary site;
convert, by the intercept routine, the data of the I/O operation in the non-supported format to a format supported by the existing replication system;
generate, by the intercept routine, a replication log record for the data in the format supported by the existing replication system; and
transmit, by a primary site replication engine operating at the primary site, the data in the format supported by the existing replication system to the secondary site, wherein by transmitting the data in the format supported by the existing replication system to the secondary site, a secondary site replication engine operating at the secondary site:
stores the data in the format supported by the existing replication system described by the replication log record in a storage device at the secondary site thereby forming a replicated file;
converts the data in the format supported by the existing replication system to the non-supported format; and
stores the data in the non-supported format in the storage device at the secondary site for use by an application operating at the secondary site.

12. The apparatus of claim 11, wherein the instructions to generate the replication log record for the data in the format supported by the existing replication system cause the processor to:
identify, by the intercept routine, documented record format descriptions created for the application, wherein the documented record format descriptions specify how the data in the format supported by the existing replication system is formatted when written; and
using, by the intercept routine, the documented record format descriptions, format the data in the non-supported format as the data in the non-supported format is being output from the application in the format supported by the existing replication system.

13. The apparatus of claim 11, wherein the replication log record for the data in the format supported by the existing replication system comprises a name of the application for which the data in the format supported by the existing replication system is associated and an association to the replicated file stored in the storage device and wherein the replication log record is used to store the data in the format supported by the existing replication system at the secondary site.

14. The apparatus of claim 11, wherein the instructions further cause the processor to:
as the replicated file is updated, rewritten, read-for-updates, or deleted, record, by the intercept routine, in the replication log record associated with the data in the format supported by the existing replication system each update, write, read, or delete.

15. The apparatus of claim 11, wherein the existing replication system is one of a Relational Database Management System (RDBMS), an Information Management System (IMS), or a Virtual Storage Access Method (VSAM) system.

* * * * *